US012633008B2

(12) United States Patent
Muscalu et al.

(10) Patent No.: US 12,633,008 B2
(45) Date of Patent: May 19, 2026

(54) SYSTEMS AND METHODS FOR GENERATING FOLDED JOINTS FOR AN OBJECT RENDERED ON A DIGITAL CANVAS

(71) Applicant: Adobe Inc., San Jose, CA (US)

(72) Inventors: Tudor Muscalu, Bucharest (RO); Shashidhar Mangu, Bangalore (IN); Piyush Vashisht, Pehlad Pur Banger (IN); Mrinalini Sardar, Kolkata (IN)

(73) Assignee: Adobe Inc., San Jose, CA (US)

( * ) Notice: Subject to any disclaimer, the term of this patent is extended or adjusted under 35 U.S.C. 154(b) by 257 days.

(21) Appl. No.: 18/365,041

(22) Filed: Aug. 3, 2023

(65) Prior Publication Data

US 2025/0045986 A1 Feb. 6, 2025

(51) Int. Cl.
G06T 11/23 (2026.01)
G06T 7/73 (2017.01)

(52) U.S. Cl.
CPC ............... G06T 11/23 (2026.01); G06T 7/73 (2017.01)

(58) Field of Classification Search
None
See application file for complete search history.

(56) References Cited

U.S. PATENT DOCUMENTS

| | | | | |
|---|---|---|---|---|
| 4,931,953 A * | 6/1990 | Uehara | ................. | G06T 11/203 382/258 |
| 5,353,396 A * | 10/1994 | Ahlquist, Jr. | ......... | G06T 11/203 345/442 |
| 6,304,677 B1 * | 10/2001 | Schuster | ............ | G06V 30/1423 345/611 |
| 2011/0199297 A1 * | 8/2011 | Antonyuk | .......... | G06V 30/1423 345/157 |
| 2014/0043342 A1 * | 2/2014 | Goel | ......................... | G06T 9/00 345/501 |
| 2014/0184590 A1 * | 7/2014 | Watanabe | ............... | G06T 15/04 345/419 |
| 2014/0285492 A1 * | 9/2014 | Asente | ................. | G06T 11/203 345/442 |

* cited by examiner

*Primary Examiner* — Jeffrey J Chow
(74) *Attorney, Agent, or Firm* — Shook, Hardy & Bacon L.L.P.

(57) ABSTRACT

Aspects of the technology described herein provide for a more precise generation of folded joints for objects rendered on a digital canvas. In an embodiment, segment points are received at the canvas from a user. From the segment points, structure points corresponding to vertices of the folded joint are identified. The structure points are connected to other identified structure points. The result is an object with a folded appearance, where the connections amongst the structure points form at least a portion of the object's perimeter.

17 Claims, 12 Drawing Sheets

400

RECEIVE AT LEAST THREE SEGMENT POINTS, THE AT
LEAST THREE SEGMENT POINTS INCLUDING A FIRST,
SECOND, AND THIRD SEGMENT POINT, EACH SEGMENT
POINT IDENTIFYING A LOCATION ON A CANVAS — 410

DETERMINE A FIRST-SECOND SEGMENT POINT PAIR BY
ASSOCIATING THE FIRST SEGMENT POINT WITH THE
SECOND SEGMENT POINT — 420

DETERMINE A SECOND-THIRD SEGMENT POINT PAIR BY
ASSOCIATING THE SECOND SEGMENT POINT WITH THE
THIRD SEGMENT POINT — 430

IDENTIFY A FIRST STRUCTURE POINT AND A SECOND
STRUCTURE POINT ON THE CANVAS, THE FIRST
STRUCTURE POINT AND THE SECOND STRUCTURE POINT
CORRESPONDING TO THE SECOND SEGMENT POINT,
WHEREIN THE FIRST STRUCTURE POINT IS IDENTIFIED AT A
FIRST INTERSECTION OF A FIRST STRUCTURE LINE
DETERMINED FROM A FIRST STROKE WIDTH FOR THE
FIRST-SECOND SEGMENT POINT PAIR AND A SECOND
STRUCTURE LINE DETERMINED FROM A SECOND STROKE
WIDTH FOR THE SECOND-THIRD SEGMENT POINT PAIR,
AND WHEREIN THE SECOND STRUCTURE POINT IS
IDENTIFIED AS COLLINEAR WITH THE FIRST STRUCTURE
POINT AND THE SECOND SEGMENT POINT, AND IS
DETERMINED FROM THE FIRST STROKE WIDTH — 440

GENERATE, FOR DISPLAY ON THE CANVAS, AN OBJECT
DEFINED BY CONNECTING THE FIRST STRUCTURE POINT
AND THE SECOND STRUCTURE POINT WITH STRUCTURE
POINTS CORRESPONDING TO THE FIRST SEGMENT POINT
AND WITH STRUCTURE POINTS CORRESPONDING TO THE
THIRD SEGMENT POINT — 450

*FIG. 4.*

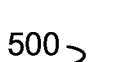

500

RECEIVE AT LEAST THREE SEGMENT POINTS, THE AT LEAST THREE SEGMENT POINTS INCLUDING A FIRST, SECOND, AND THIRD SEGMENT POINT, EACH SEGMENT POINT IDENTIFYING A LOCATION ON A CANVAS, THE FIRST SEGMENT POINT AND THE SECOND SEGMENT POINT FORMING A FIRST-SECOND SEGMENT POINT PAIR, THE SECOND SEGMENT POINT AND THE THIRD SEGMENT POINT FORMING A SECOND-THIRD SEGMENT POINT PAIR

510

DISPLAY, ON THE CANVAS, AN OBJECT GENERATED BY CONNECTING A FIRST STRUCTURE POINT AND A SECOND STRUCTURE POINT WITH STRUCTURE POINTS CORRESPONDING TO THE FIRST SEGMENT POINT AND WITH STRUCTURE POINTS CORRESPONDING TO THE THIRD SEGMENT POINT, THE FIRST STRUCTURE POINT IDENTIFIED BASED ON A FIRST INTERSECTION OF A FIRST STRUCTURE LINE DETERMINED FROM A FIRST STROKE WIDTH FOR THE FIRST-SECOND SEGMENT POINT PAIR AND A SECOND STRUCTURE LINE DETERMINED FROM A SECOND STROKE WIDTH FOR THE SECOND-THIRD SEGMENT POINT PAIR, THE SECOND STRUCTURE POINT IDENTIFIED AS COLLINEAR WITH THE FIRST STRUCTURE POINT AND THE SECOND SEGMENT POINT AND DETERMINED FROM THE FIRST STROKE WIDTH

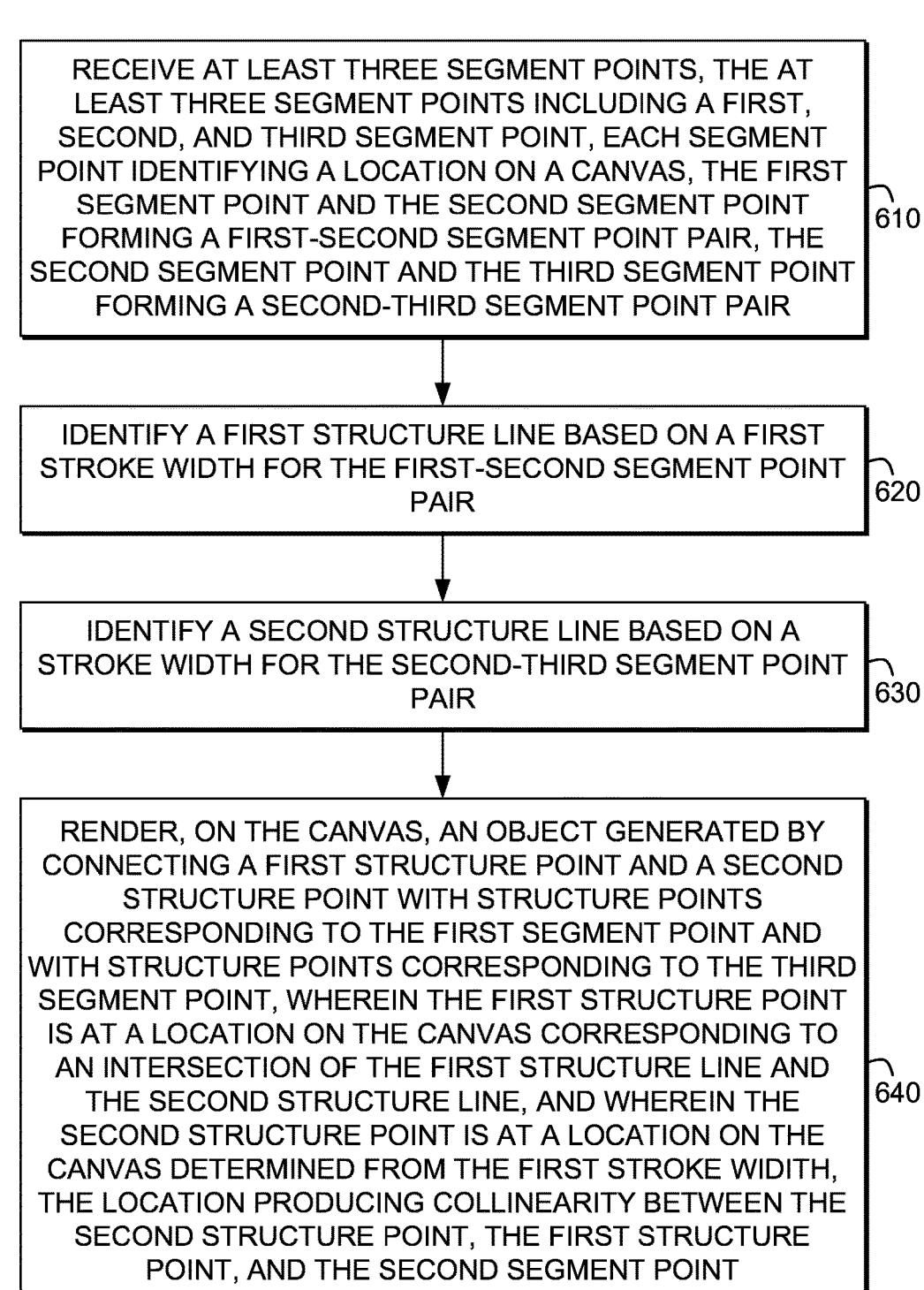

RECEIVE AT LEAST THREE SEGMENT POINTS, THE AT LEAST THREE SEGMENT POINTS INCLUDING A FIRST, SECOND, AND THIRD SEGMENT POINT, EACH SEGMENT POINT IDENTIFYING A LOCATION ON A CANVAS, THE FIRST SEGMENT POINT AND THE SECOND SEGMENT POINT FORMING A FIRST-SECOND SEGMENT POINT PAIR, THE SECOND SEGMENT POINT AND THE THIRD SEGMENT POINT FORMING A SECOND-THIRD SEGMENT POINT PAIR

610

IDENTIFY A FIRST STRUCTURE LINE BASED ON A FIRST STROKE WIDTH FOR THE FIRST-SECOND SEGMENT POINT PAIR

620

IDENTIFY A SECOND STRUCTURE LINE BASED ON A STROKE WIDTH FOR THE SECOND-THIRD SEGMENT POINT PAIR

630

RENDER, ON THE CANVAS, AN OBJECT GENERATED BY CONNECTING A FIRST STRUCTURE POINT AND A SECOND STRUCTURE POINT WITH STRUCTURE POINTS CORRESPONDING TO THE FIRST SEGMENT POINT AND WITH STRUCTURE POINTS CORRESPONDING TO THE THIRD SEGMENT POINT, WHEREIN THE FIRST STRUCTURE POINT IS AT A LOCATION ON THE CANVAS CORRESPONDING TO AN INTERSECTION OF THE FIRST STRUCTURE LINE AND THE SECOND STRUCTURE LINE, AND WHEREIN THE SECOND STRUCTURE POINT IS AT A LOCATION ON THE CANVAS DETERMINED FROM THE FIRST STROKE WIDITH, THE LOCATION PRODUCING COLLINEARITY BETWEEN THE SECOND STRUCTURE POINT, THE FIRST STRUCTURE POINT, AND THE SECOND SEGMENT POINT

SYSTEMS AND METHODS FOR GENERATING FOLDED JOINTS FOR AN OBJECT RENDERED ON A DIGITAL CANVAS

BACKGROUND

Graphic design software enables the creation of visual compositions via illustration on a digital canvas. Illustrations are typically performed by a user editing, drawing, and overlaying various shapes, lines, and curves on a canvas. Oftentimes, a user may wish to create a graphic with a folded appearance.

INTRODUCTION

At a high level, aspects of the technology described herein relate to methods, systems, and computer storage media for generating folded joints for objects rendered on a digital canvas. More specifically, aspects allow for automatic generation of graphic elements having a folded effect. A folded effect may appear as one portion of an object bending over on itself to cover another portion of the object. Oftentimes, a user may wish to generate a folded effect to enhance the quality of a graphic. However, prior methods of generating these desired folds are manual, some of which required users to guess the best locations to draw parts of the folded design.

One example method for generating folded graphics includes receiving segment points from a user at the canvas. The segment points are related to one another using segment lines, which generally form the shape of the object. From the segment lines, structure points are determined. The precise location of the structure points are generally responsible for the object's folded appearance. By connecting the structure points to one another, an object with a folded effect is created.

BRIEF DESCRIPTION OF THE DRAWINGS

The present technology is described in detail below with reference to the attached drawing figures, wherein:

FIG. 4 provides a first example method of generating a folded joint, in accordance with embodiments of the technology described herein;

FIG. 5 provides a second example method of generating a folded joint, in accordance with embodiments of the technology described herein;

FIG. 6 provides a third example method of generating a folded joint, in accordance with embodiments of the technology described herein.

DETAILED DESCRIPTION

Figure 1:
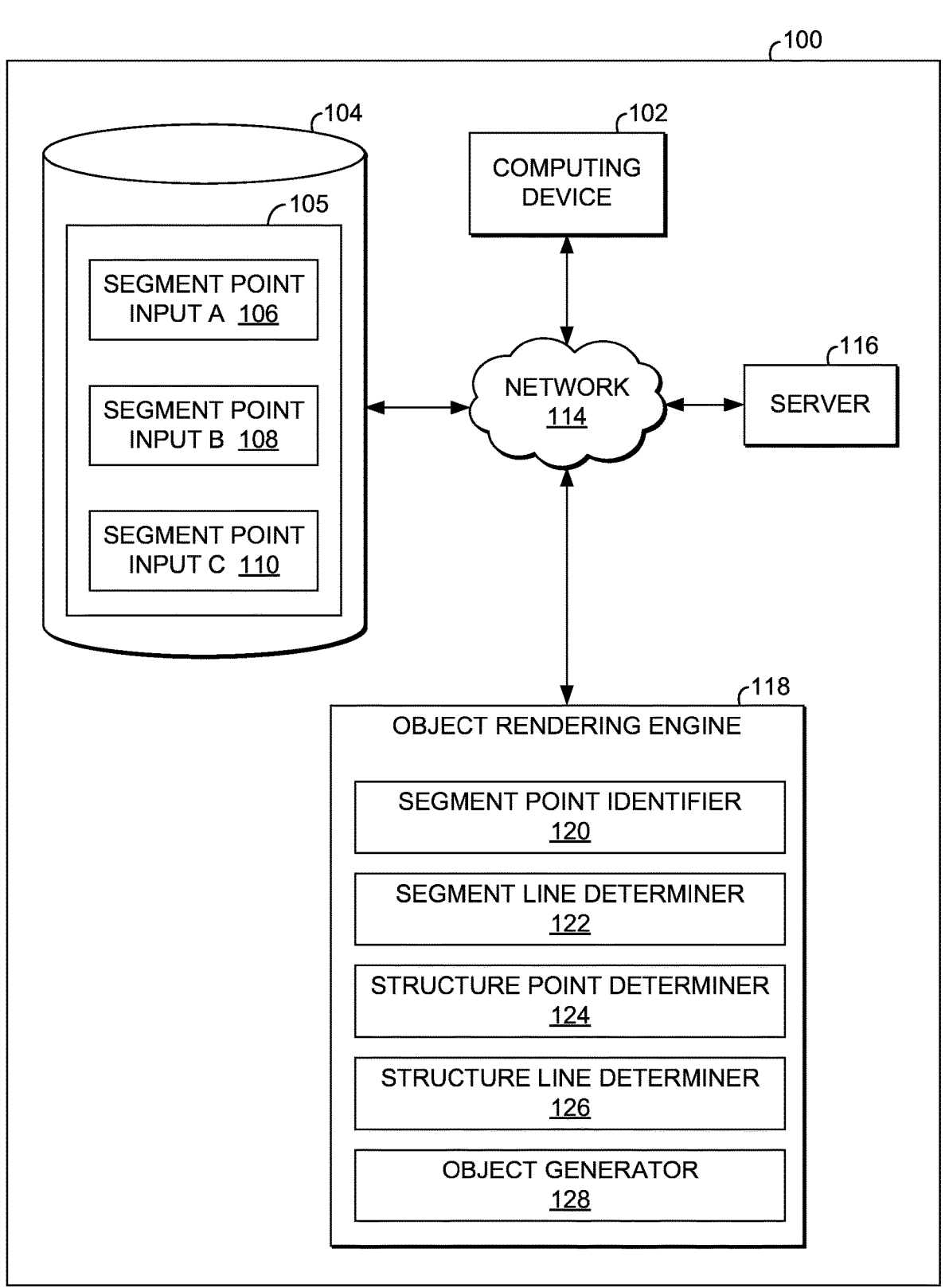
FIG. 1 is a block diagram of an example object rendering an environment suitable for use in implementing embodiments of the technology described herein, in accordance with an aspect described herein.

Graphic design software enables a user to create visual compositions via illustration on a digital canvas. Illustrations are performed by way of a user inputting commands on a computer corresponding to editing, drawing, and overlaying various shapes and curves on a canvas. Compositions may include graphics, such as logos or icons, with visual or textual elements. In such instances, the particular aesthetic details of the graphic may determine its appeal. To that end, a user may wish to create a specific visual element that contributes to a graphic's message.

One such visual element may be a fold. A folded joint may appear as a bend in a linear object, akin to a crease in a sheet of paper. Oftentimes, folded elements may be desired in a graphic comprising two or more linear strokes. In a graphic comprising the letter "W" for example, a user may wish to generate a folded element at the three joints where the strokes meet.

Many conventional methods for creating the appearance of a fold, however, require precise manual inputs from the user. In particular, a user may need to input precise locations corresponding to the edges of the folded element and its adjacent structure, as well as the points at which the edges intersect. The preceding method may require time-intensive manipulations by the user that introduce the potential for error. For instance, a user may "eyeball" where edges and points of the folded element belong. In doing so, the user would have to manually manipulate the points on a digital canvas to define the general nature of the folded composition. Such imprecise methods heighten the risk that edges or points of the folded element appear out of place, thereby undermining the visual appeal of the graphic. The issue of imprecise placement when manually generating folds results in enhanced visual distortions when compositions are rendered at a high quality or enlarged in size. In addition, such methods are needlessly time-consuming, undermining the efficiency with which graphics can be created. Each of the aforementioned problems is compounded in situations where a user chooses to implement multiple folded elements in a single graphic. In sum, even the best conventional methods for creating a folded joint remain imprecise and cumbersome.

Aspects of the technology described herein solve the above-identified problems through the employment of a folded joint tool for a digital canvas. As such, the folded joint tool solves the aforementioned problems by automatically generating a folded joint without the need for manual inputs from a user. In limiting such manual inputs, the folded joint tool reduces the need for manual manipulation and placement of object features, which is often where distortions are introduced, thereby increasing the efficiency with which graphics can be created, and rendering a graphic object that can be enhanced in quality or enlarged in size in a manner that does not show visual distortions. In addition, by automatically creating consistently precise folded joints, the tool reduces the possibility that a user's guesswork may weaken a graphic's appeal. Thus, the tool enables a user to create aesthetic folds more efficiently and more precisely than conventional methods.

In addition, aspects of the technology described herein improve the functioning of a computer in a number of ways. For example, aspects of the technology described herein significantly decrease the computational costs associated with conventional methods that require manual manipulation by the user. With conventional methods, users often resort to drawing additional points and edges on the canvas to determine, by themselves, the structure of the folded joint. Once drawn, said points and edges are stored as data objects that must be retrieved and processed by the computer for the purposes of generating the folded joint. Each data object stored and retrieved costs additional computational resources. Many of these additional points and edges are used solely for determining the object's structure and are later removed as not part of the final rendered object. As such, the technology described herein, by reducing manual inputs, including those needed to generate the additional points and edges, decreases the number of reads and writes from computer memory, henceforth reducing computing resource consumption associated with rendering graphical objects relative to conventional methods.

The technology described herein performs a series of operations that generates a folded joint for an object rendered on a digital canvas. The object can be formed from an initial composition of points in space connected to one another by line segments. The configuration of the line segments generally forms the shape of the object. In some cases, the line segments are theoretical, in that they are generated for operational purposes but not available for display on the canvas. In other cases, the line segments may be initially rendered as a drawing aid. A vertex, as described herein, is a point of connection for two line segments. Any vertex may be an appropriate location for a folded joint. The operations described herein generate folded joints by using a composition of points and line segments to determine the positioning of various structural elements (e.g., vertices and edges) of the object. By generating the folded joint without manual input from the user, the positioning of the various structural elements are more accurately defined, resulting in a more precise object that can be visually enhanced and enlarged without distortion.

Accordingly, one example method for generating folded joints that achieves these benefits begins with receiving segment points from a user at the canvas. The canvas may be a two-dimensional canvas, and it may be defined in terms of a Cartesian coordinate plane. Each segment point identifies a location on the canvas. Thus, each segment point is a position on the canvas that can be defined by an X and Y coordinate. The method further comprises determining pairs of segment points via association. A pair of associated segment points denotes the endpoints of a line segment, herein referred to as a segment line. Accordingly, a segment line can be fully defined in space by the pair of segment points comprising its endpoints.

At a high level, segment points are points on the ends of each stroke of the rendered object. A stroke is a linear fragment of the rendered object having a width, herein referred to as a stroke width, to a segment line connecting a pair of segment points. Each segment line corresponds to a stroke, and each stroke has a particular stroke width. Thus, the segment lines corresponding to the pairs of segment points generally follow the shape of the rendered object, whereas strokes generally form the body of the rendered object.

In general, at least three segment points form a vertex. As such, three segment points may be received at the canvas to create a folded joint. In some embodiments, folded joints may be created at vertices. Pursuant to the example method, a first, second, and third segment point may be received at the canvas. A first-second segment point pair may be identified by associating the first and second segment points, and a second-third segment point pair may be identified by associating the second and third segment points. The segment points of each pair, when connected by segment lines, generally follow the shape of the rendered object, even in cases where the segment line is theoretical in nature. The second segment point, in being common to each segment point pair, is the vertex of the two segment lines. Thus, the second segment point may be a location eligible for a folded joint. As each vertex corresponds to a segment point, folded joints created at segment line vertices may be uniquely identified by a particular segment point.

The example method further comprises identifying, determining, and connecting various structure points. Like segment points, each structure point identifies a location on the canvas and may be defined by an X and Y coordinate in canvas space. At a high level, structure points represent vertices of the perimeter of the rendered object. Accordingly, structure points, when connected, may form at least a portion of a perimeter of the rendered object. The perimeter of an object, as described herein, is the path that surrounds and outlines the object. The perimeter may include a plurality of edges, which are discrete line segments that join the vertices of the object. Each segment point is collinear with two corresponding structure points. Thus, a pair of structure points, when connected with their corresponding segment point, may form an edge of the rendered object. In particular, a pair of structure points, when linearly connected with the segment point of the folded joint, may form the edge of the folded joint.

The example method comprises identifying the two structure points corresponding to the segment point of a folded joint. A first structure point is identified at the intersection of two structure lines. At a high level, structure lines are lines coincident with edges (e.g., at least a portion of the perimeter) of the rendered object. In other words, segments of structure lines may form the perimeter of the rendered object. Additionally, structure lines may form the lateral edges of strokes. Thus, the orientation of structure lines may be determined based on the orientation of a stroke, the stroke being derived from a segment line and a stroke width. For instance, in the event a first, second, and third segment point are received at the canvas, a structure line corresponding to the first-second segment point pair may be determined based on the segment line connecting the segment point pair in conjunction with a stroke width. Likewise, a structure line for the second-third segment point pair may be determined. As stated above, the first structure point for the folded joint is identified at a location corresponding to the intersection of two structure lines. Meanwhile, the second structure point for the folded joint is identified based on collinearity with the first structure point and based on a stroke width. In sum, the structure points for the folded joint, which aid the joint's folded appearance, are identified based on points, lines, and segments derived from the segment points initially received at the canvas.

The example method further comprises, upon identifying the structure points for the folded joint, generating the object for display at the canvas. As described above, structure points represent vertices of the perimeter of the rendered object. Thus, the object may be generated by connecting the structure points for the folded joint to structure points corresponding to the other segment points. In the event that more than one folded joint is present, the structure points of one folded joint may be connected to the structure points of another folded joint. Connecting the structure points may form at least a portion of the perimeter of the object, identifying locations at which the object is digitally rendered. In sum, given a first, second, and third segment point are received at the canvas, the object is generated by determining the structure points of the first, second, and third segment points, and connecting said structure points to form the perimeter of the object.

It will be realized that the method previously described is only an example that can be practiced from the description that follows, and it is provided to more easily understand the technology and recognize its benefits. Additional examples are now described with reference to the figures.

With reference to FIG. 1, FIG. 1 illustrates an example object rendering environment 100 in which methods of the present disclosure may be employed. In particular, FIG. 1 shows a high-level architecture and operations of the object rendering engine 118 in accordance with implementations of the present disclosure. In one embodiment, the object rendering engine 118 runs in one or more data centers. The object rendered by the object rendering engine 118 may be communicated over a network 114 to a computing device 102.

It should be understood that this and other arrangements described herein are set forth only as examples. Other arrangements and elements (e.g., machines, interfaces, functions, orders, and groupings of functions, etc.) may be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, or software. For instance, some functions may be carried out by a processor executing instructions stored in memory.

Moreover, these components, functions performed by these components, or services carried out by these components are implemented at appropriate abstraction layer(s), such as the operating system layer, application layer, hardware layer, etc., of the computing system(s). Alternatively, or in addition, the functionality of these components or the embodiments of the technology described herein are performed, at least in part, by one or more hardware logic components. For example, and without limitation, illustrative types of hardware logic components include field-programmable gate arrays (FPGAs), application-specific integrated circuits (ASICs), application-specific standard products (ASSPs), system-on-a-chip systems (SOCs), complex programmable logic devices (CPLDs), etc. Additionally, although functionality is described herein regarding specific components shown in example environment 100, it is contemplated that in some embodiments functionality of these components are shared or distributed across other components. For example, some components shown as part of the object rendering engine 118 can alternatively or additionally reside on, or be executed by, the computing device 102, server 116, or both, and in any combination.

Among other components not shown, the object rendering environment 100 includes network 114, a computing device 102, a data store 104, a server 116, and an object rendering engine 118.

The network 114 can take different forms including, without limitation, one or more local area networks (LANs) or wide area networks (WANs). In example implementations, network 114 comprises the Internet or a cellular network, amongst any of a variety of possible public or private networks.

The computing device 102 is alternatively described herein as a client device on the client-side of the environment 100, while the server 116 may be described as the server-side of operating environment 100. Server 116 may implement functions of the object rendering engine 118 in whole or in part. The computing device 102 is any type of computing device capable of use by a user. For example, in one embodiment, computing device 102 is of the type of computing device described in relation to FIG. 7 herein. In various embodiments, the computing device 102 is a personal computer (PC), a laptop computer, a mobile or mobile device, a smartphone, a tablet computer, a smart watch, a wearable computer, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device. Server 116 may comprise a process for executing functions of object rendering engine 118.

The data store 104 generally stores information, including data, computer instructions (e.g., software program instructions, routines, or services), or models used in embodiments of the described technologies. Although depicted as a single database component, data store 104 may be embodied as one or more databases or may be in the cloud.

In the example illustrated, the data store 104 stores a plurality of segment point inputs 105. The plurality of segment point inputs 105 may comprise two or more segment point inputs, such as the three illustrated in FIG. 1 segment point input A 106, segment point input B 108, and segment point input C 110. In general, segment point inputs may be input at computing device 102 by a user and may indicate a location on a canvas. The segment point inputs may be received from the computing device 102 at, and for use by components of, the object rendering engine 118.

For instance, the data store 104 may store inputs corresponding to a first segment point A 106, a second segment point B 108, and a third segment point C 110. In one embodiment, the segment point inputs are stored as an object with metadata. The metadata may define properties of the segment point. More specifically, the metadata may comprise a set of coordinates corresponding to a location on a canvas for the segment point. The set of coordinates may be represented by an X and a Y coordinate. In the same or other embodiments, the metadata may comprise coordinates corresponding to other segment points. In yet further embodiments, the metadata may include coordinates corresponding to other structure points. When executing the generation of a folded joint, a plurality of segment point inputs 105 may be received from the computing device 102 and stored in the data store 104. The segment point inputs may be retrieved from the data store 104 by the server 116 and communicated via network 114 for processing by the object rendering engine 118. The object rendering engine 118, in addition, may communicate information corresponding to the segment points for the purposes of display at computing device 102.

As noted, object rendering engine 118 generally generates an object for display at computing 102. The example object rendering engine 118 includes a segment point identifier 120, a segment line determiner 122, a structure point determiner 124, a structure line determiner 126, and an object generator 128. It will be appreciated that the object rendering engine 118 as illustrated and described is one example suitable for use. Other systems may comprise more or fewer components with various functionality. Such systems are intended to be within the scope of the disclosure.

The segment point identifier 120 generally uses the segment point inputs received at the computing device 102 and retrieved from the data store 104 to identify locations of segment points on a canvas. The segment point identifier 120 generally uses the segment point inputs to identify the locations of segment points on a canvas. The segment points may be received by input at computing device 102, where the input indicates a location on a canvas. In one embodiment, the segment point identifier 120 may identify and store the X-Y coordinate associated with the input location, thus defining the segment point in terms of its position on a canvas. It will be understood that other coordinate systems, defining relative locations in a two- or three-dimensional space, may be used. Throughout this disclosure, reference is made to a Cartesian coordinate system as an example. Segment point identifier 120 may identify segment points by receiving segment point inputs or otherwise accessing stored segment points or segment point input data from memory, such as datastore 104. Segment points may be illustrated on a canvas or may be defined in memory, or both, for use by other components of object rendering engine 118.

An example canvas 200 is shown in the embodiment depicted by FIGS. 2A-2F. In one embodiment, the segment point identifier may identify a location corresponding to a segment point based on the segment point's metadata. With specific reference to FIG. 2A, the figure generally illustrates a canvas 200, having three received segment points respectively identifying locations on the canvas 200. As this example canvas is a two-dimensional canvas, the locations of each segment point, first segment point A 202, second segment point B 204, and third segment point C 206, can each be represented using X and Y values for an X-Y coordinate system. In an embodiment, once input onto canvas 200, the segment point identifier 120 determines the X and Y values of the location, thus defining determining the segment point in terms of its relative location on the canvas 200.

Referring back to FIG. 1, the segment line determiner 122 generally determines segment lines. The segment line determiner 122 uses the location of the segment points (e.g., their location as defined in terms of X and Y coordinate values) identified by the segment point identifier 120 to determine a segment line. The segment line determiner 122 determines a segment line by associating a pair of segment points, where the segment points are the endpoints of the determined segment line.

Segment lines are illustrated by example in FIGS. 2B-2F, and include the first segment line 210 and the second segment line 212, for example. Segment lines generally form the shape of an object. As an example, segment line determiner 122 may generate a line that extends through each segment point of a segment point pair. Segment line determiner 122 may define the segment line in terms of mathematical functions, such as defining the generated line based on slope, x or y intercept, or other like geometric features.

For instance, a first segment line determined by associating a first pair of segment points and a second segment line determined by associating a second pair of segment points, when connected, may generally follow the shape of an object. In some embodiments, segment lines may be rendered on the canvas as a drawing aid. In other embodiments, the segment lines may be theoretical, in that they are mathematical constructs used for operational purposes but not displayed on the canvas. For illustrative purposes, FIG. 2B illustrates some example segment lines generated by the segment line determiner 122. Here, a first segment line 210 is determined by extending (e.g., defining) a line that intersects the first segment point A 202 and the second segment point B 203 of a first-second segment point pair. Further, a second segment line 212 is determined by extending a line that intersects the second segment point B 204 and the third segment point C 206 of a second-third segment point pair.

The object rendering engine 118 further includes a structure point determiner 124. The structure point determiner 124 generally identifies the location of structure points. Structure points are points representing vertices on the perimeter of an object, including vertices at a folded joint. Structure points, like segment points, identify a location on the canvas. Structure points may be identified by an X-Y coordinate in canvas space. In some embodiments, structure points are associated with a corresponding segment point. For instance, in one embodiment, each segment point may comprise two corresponding structure points. Structure points may be illustrated on a canvas or be defined in memory, or both, for use by other components of object rendering engine 118.

The structure point determiner 124 may determine structure points using segment points and segment lines, respectively determined using segment point identifier 120 and segment line determiner 122. For example, in one embodiment, a first structure point at a segment point corresponding to the folded joint may be determined based on the intersection of two structure lines. This is illustrated in FIG. 2C, where a first structure point R 220 is identified at the intersection of the first structure line 234 and the second structure line 232. Structure points may also be determined based on a geometric relationship with other segment points and other structure points. For instance, in FIG. 2D, a second structure point S 222 is identified based on a collinear relationship with the second segment point B 204 and the first structure point R 220.

Figure 2A:
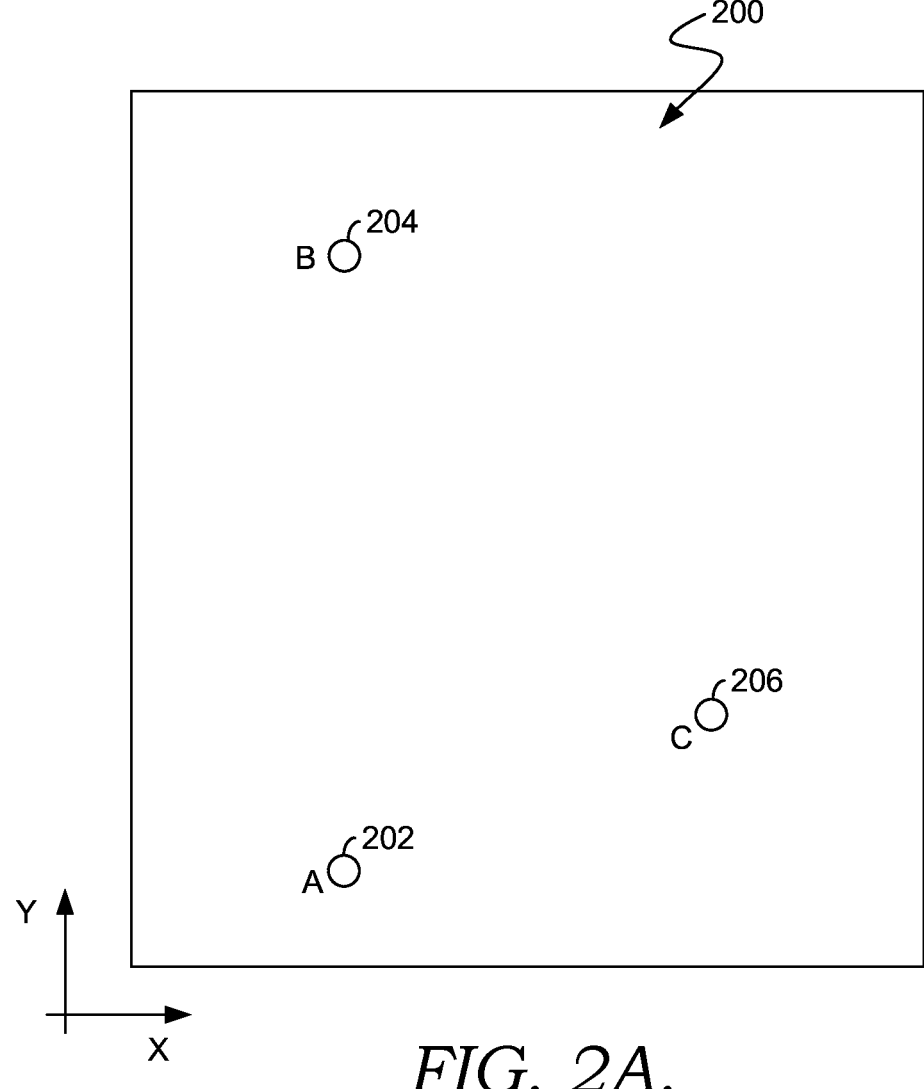
FIGS. 2A-2F illustrate steps for generating a folded joint on a digital canvas, in accordance with an aspect described herein.
Figure 2B:
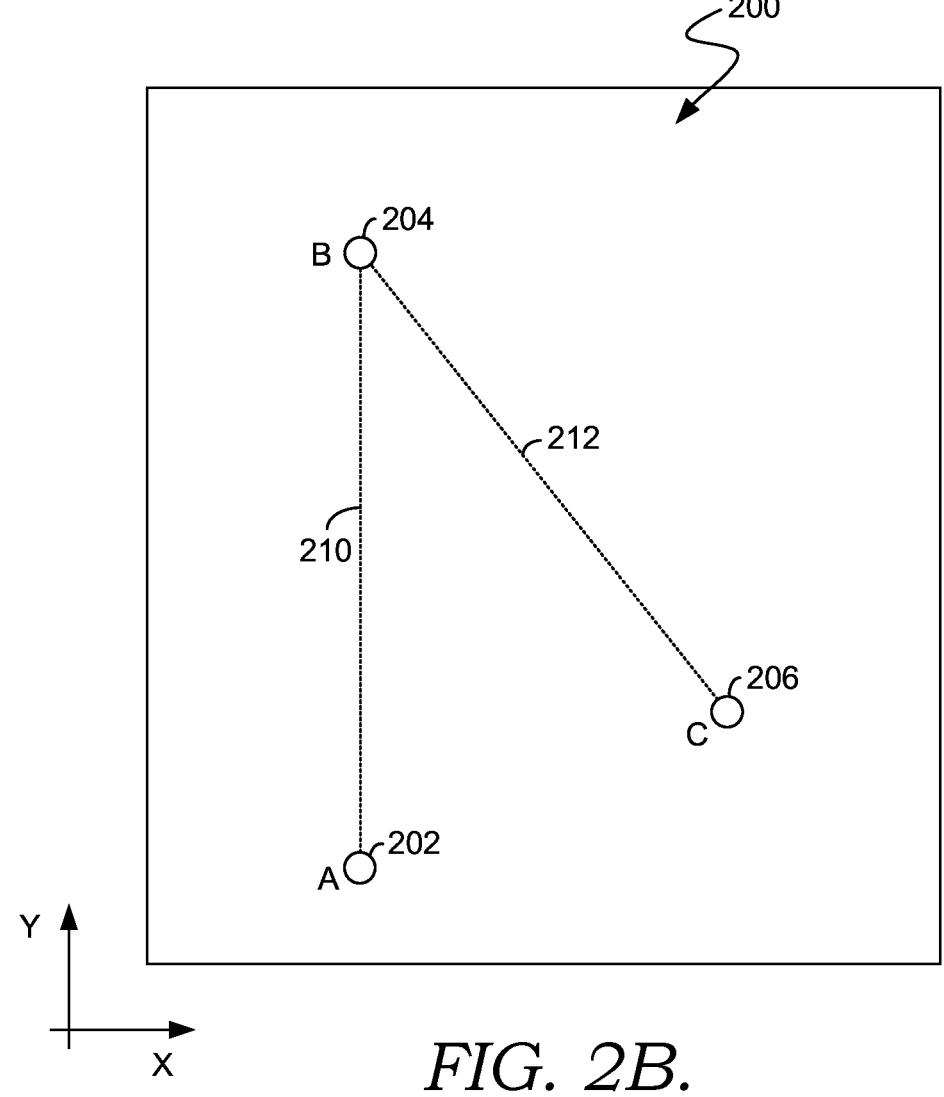
Figure 2C:
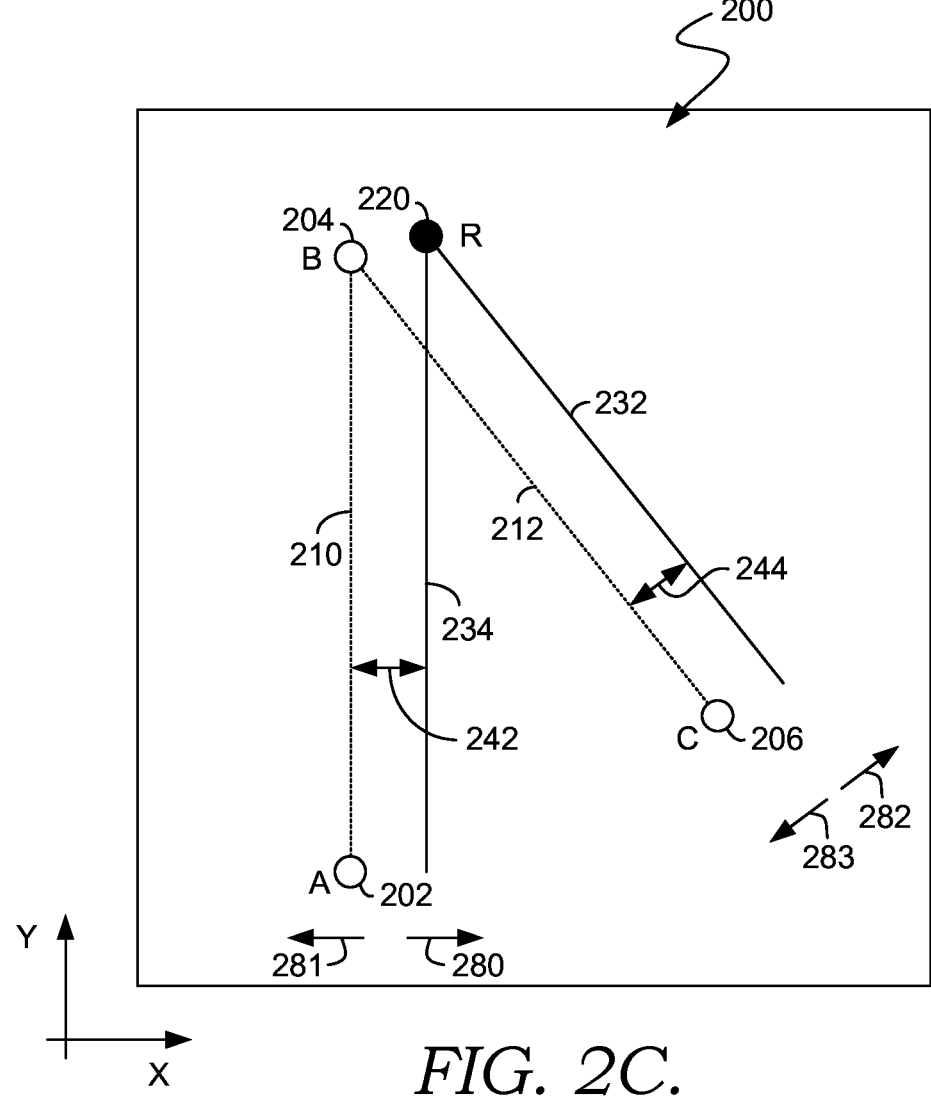
Figure 2D:
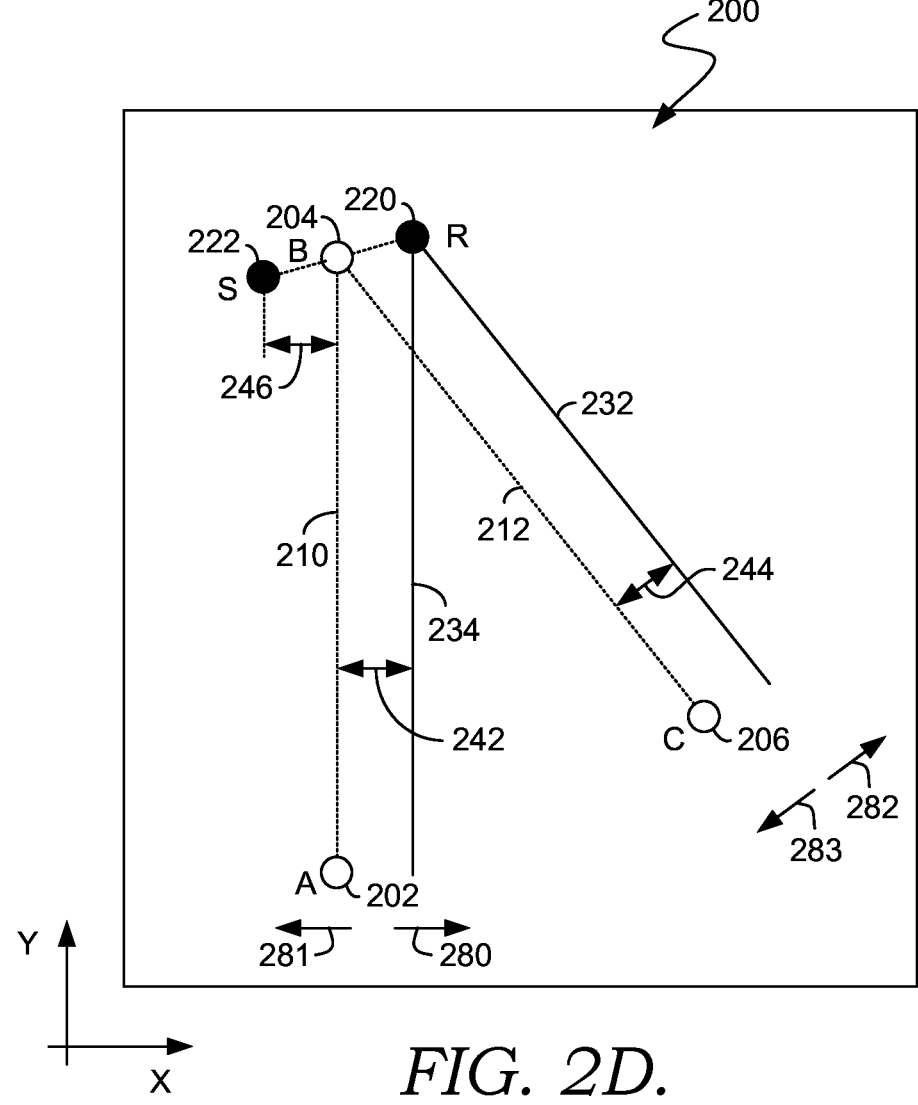
Figure 2E:
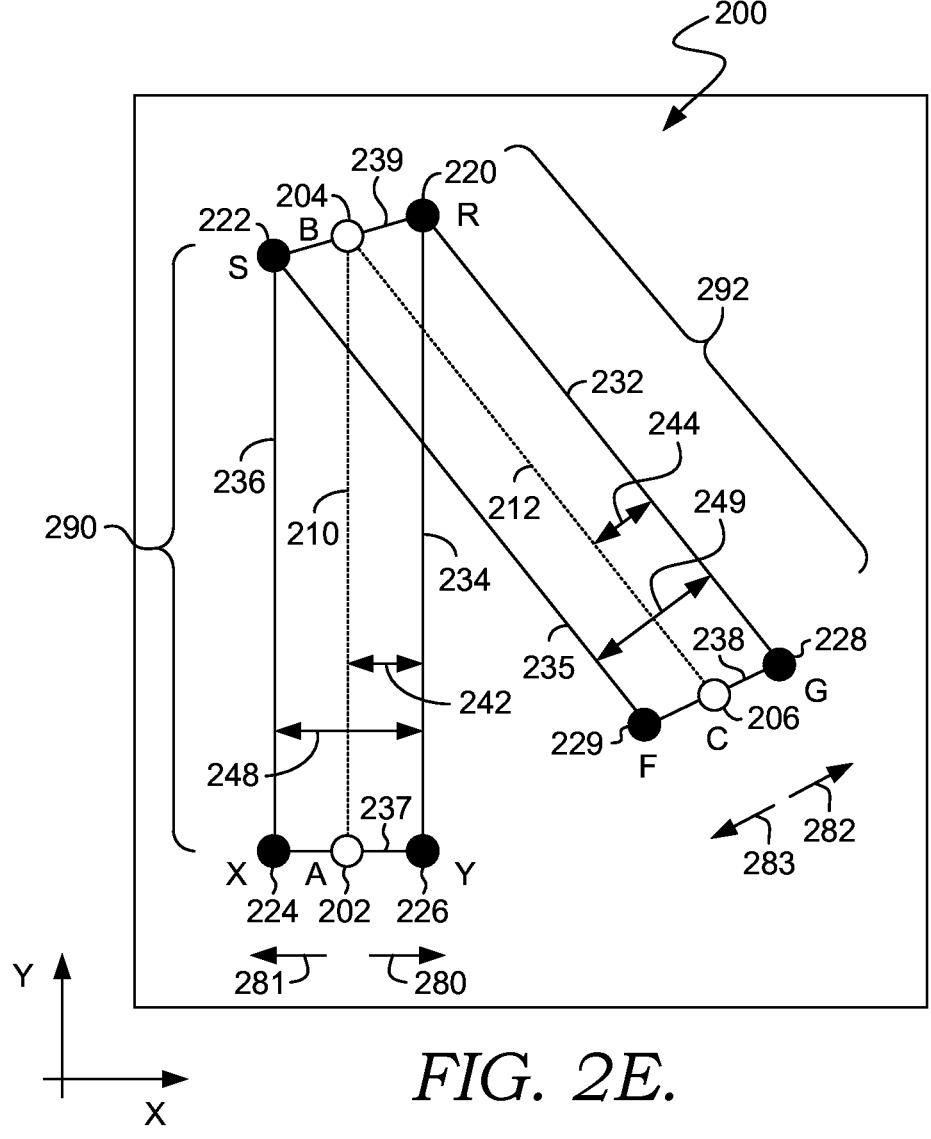
Figure 2F:
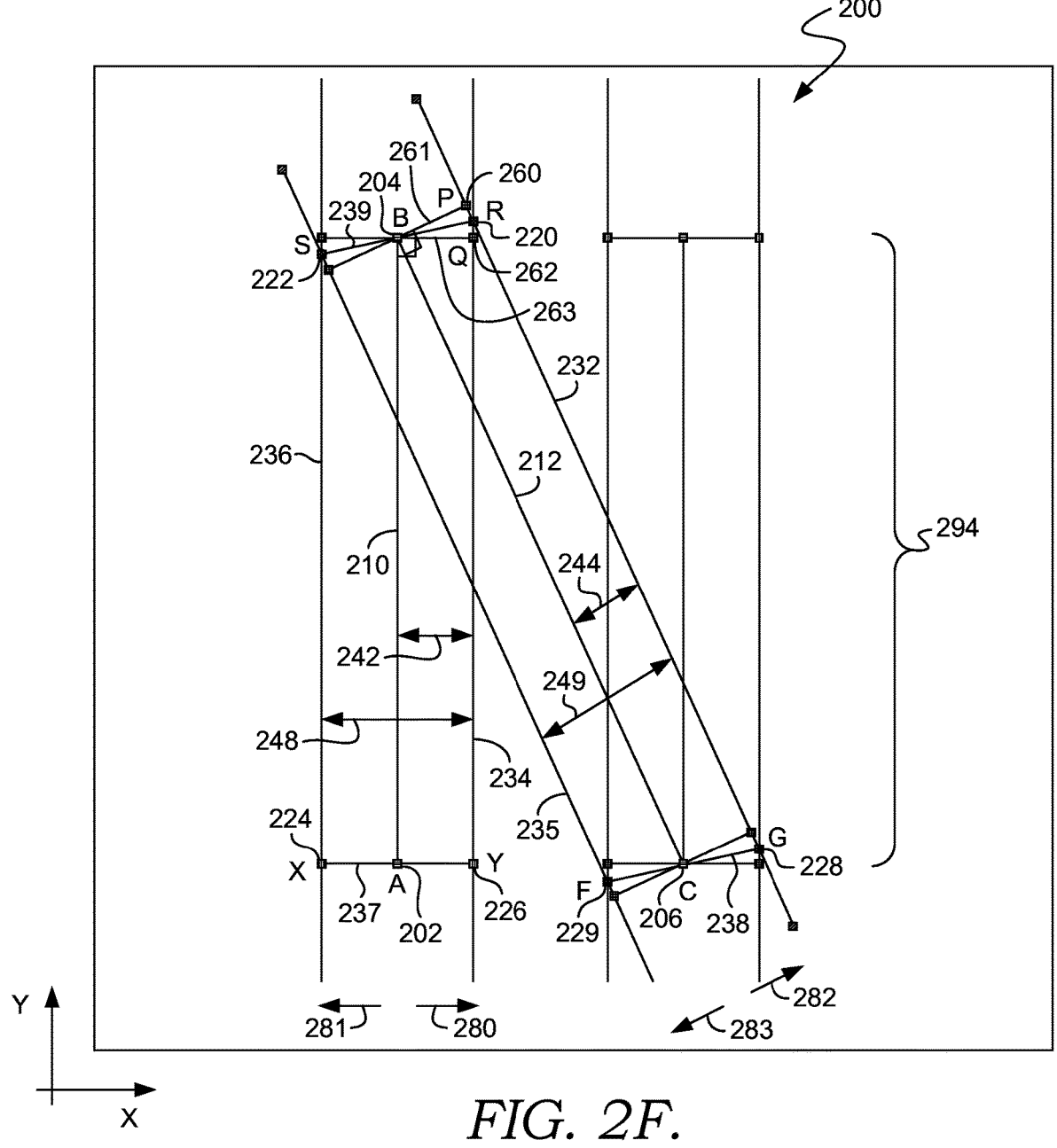

As can be seen in FIG. 2F, structure point determiner 125 may identify structure points corresponding to the first segment point A 202. In the example illustrated, first segment point A 202 corresponds to two structure points, including third structure point Y 226 and fourth structure point X 224. Each of third structure point Y 226 and fourth structure point X 224 is identified based on the structure points being collinear with the first segment point A 202. That is, each of third structure point Y 226, fourth structure point X 224, and first segment point A 202 may fall on a same line, e.g., a first line. Each of third structure point Y 226 and fourth structure point X 224 can be identified based on the structure points being half a first stroke width 242 distance spaced apart from the first segment point A 202.

Further, structure point determiner 125 may identify structure points corresponding to the third segment point C 206. In the example illustrated, third segment point C 206 corresponds to two structure points, including fifth structure point G 228 and sixth structure point F 229. Each of the fifth structure point G 228 and the sixth structure point F 229 is identified based on the structure points being collinear with the third segment point C 206. That is, each of the fifth structure point G 228, sixth structure point F 229, and third segment point C 206 may fall on a same line, e.g., a second line. Each of fifth structure point G 228 and sixth structure point F 229 can be identified based on the structure points being half a second stroke width 244 distance spaced apart from the third segment point C 206.

The object rendering engine 118 also includes a structure line determiner 145. The structure line generally determines the orientation and location of structure lines. Structure lines are lines including segments that form at least a portion of the perimeter of an object. Accordingly, structure lines are typically coincident with edges of a rendered object. Put differently, structure lines may partially form the lateral edges of strokes. The structure line determiner 126 may determine structure lines from a stroke width. In FIG. 2C, for example, a first structure line 234 is determined at a distance half the first stroke width 242 from the first segment line 210. In the same or other embodiments, a structure line may be determined based on being parallel to a particular segment line. With respect again to FIG. 2C, for instance, the first structure line 234 is parallel to the first segment line 210. Structure lines may be theoretical, in that they are mathematical constructs used for operational purposes but not displayed on the canvas. Similarly, a second structure line 232 is determined at a distance half the second stroke width 244 from the second segment line 212. Here also, the second structure line 232 is parallel to the second segment line 212.

The object rendering engine 118 further comprises an object generator 128. The object rendering engine 118 generally generates an object having a fold for display on a computing device, such as the computing device 102. The object generator 128 uses elements including segment points, segment lines, structure points, and structure lines, as well as any relationships amongst the aforementioned elements therein, to generate the object for display.

In one embodiment, an object is generated by connecting various structure points. Specifically, structure points corresponding to a segment point at the folded joint may be connected to structure points corresponding to other segment points to generate a portion of the perimeter of the rendered object. An example is illustrated in FIG. 2E. Here, the first structure point R 220 is connected to structure points Y 226, G 228, and S 222. Together, the connections form at least a portion of the object's perimeter. Similarly, the second structure point S 222 is connected to structure points R 220, X 224, and F 229. Additionally, structure points sharing a common segment point may be connected to form at least a portion of the edges of an object. For instance, given at least two structure points corresponding to the segment point of a folded joint, a first structure point may be linearly connected to a second structure point to form an edge of the folded joint.

To form another portion of the perimeter of the object illustrated on canvas 200, object generator 128 may form a portion of a perimeter of the object coincident with a first line connecting the third structure point Y 226, fourth structure point X 224, and first segment point A 202. In a similar manner, to form another portion of the perimeter of the object illustrated on canvas 200, an object generator may form another portion of the perimeter of the object coincident with a second line connecting the fifth structure point G 228, sixth structure point F 229, and third segment point C 206.

To form another portion of the perimeter of the object illustrated on canvas 200, object generator 128 may form a portion of a perimeter of the object coincident with the first structure line 234. To form another portion of the perimeter of the object illustrated on canvas 200, object generator 128 may form another portion of the perimeter of the object coincident with the second structure line 232.

Figure 3:
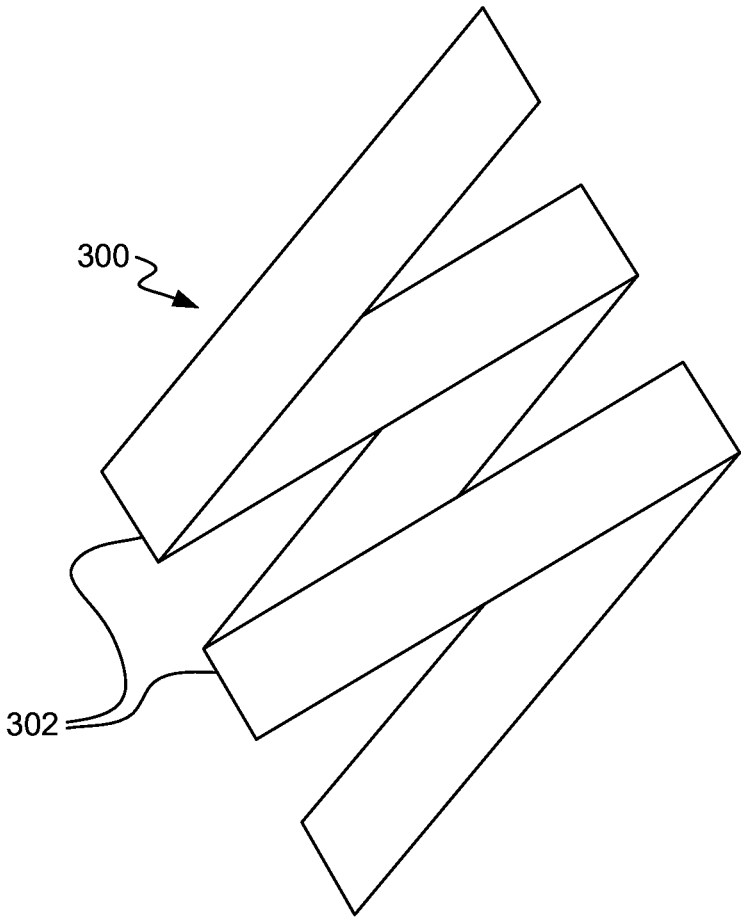
FIG. 3 is an illustration of an example object with folded joints generated using an embodiment of the technology described herein, in accordance with an aspect described herein.

FIG. 3 depicts one object 300 with some folded joints 302 generated by the present technology in accordance with the embodiment disclosed in FIGS. 2A-2F. The object 300 may be generated by the object rendering engine 118 using a plurality of segment point inputs 105 received by the user at computing device 102. At the folded joints 302, the object 300 appears to bend over and cover a portion of itself, thereby structurally mimicking a fold.

Turning back to FIGS. 2A-2F, the figures illustrate one embodiment for generating a folded joint on a digital canvas.

It should be understood the illustrations of FIGS. 2A-2F are an example and not intended to be limiting. In FIG. 2A, a first segment point A 202, a second segment point B 204, and a third segment point C 206 are received at the digital canvas 200. The digital canvas 200 is two-dimensional. The digital canvas 200 and objects thereon may be displayed at the client device 110. The first segment point A 202, second segment point B 204, and third segment point C 206 each identify locations on the canvas. The segment points may be identified by the segment point identifier 120. In some embodiments, the canvas may described in a Cartesian coordinate plane and the location of the segment points identified by an X and Y coordinate. The first segment point A 202, second segment point B 204, and third segment point C 206 may each be identified using segment point identifier 120 of FIG. 1. The first segment point A 202, second segment point B 204, and third segment point C 206 are examples of segment points that may be generated, or otherwise rendered, from the segment point input A 106, the segment point input B 108, and the segment point input C 110, respectively.

At FIG. 2B, pairs of segment points are determined by association. A first-second segment point pair is determined by associating the first segment point A 202 with the second segment point B 204. Likewise, a second-third segment point pair is determined by associating the second segment point B 204 with the third segment point C 206. The first-second segment pair is illustrated by a first segment line 210, and the second-third segment point pair is illustrated by a second segment line 212. The segment lines may be determined by the segment line determiner 122. The first segment line 210 and second segment line 212 are displayed for purposes of a drawing aid. In some embodiments, however, the segment lines and segment points may be theoretical, in that they are mathematical constructs for describing locations at the canvas and used by object generator 128 for generating an object for display.

In aspects, the user determines the association between segment points to form segment point pairs, such as the first-second segment pair and the second-third segment point pair. For example, the segment point pairs may be determined based on the order the user inputs the segment point. That is, the segment point pairs may be based on the sequential order of inputs corresponding to the segment point. For example, the first segment point A 202 is input first. The second segment point B 204 is input second. Based on the first segment point A 202 being input in sequential order with the second segment point B 204, each are included in the first-second segment point pair. In a similar manner, the third segment point C 206 is input following the input corresponding to the second segment point B 204. Thus, the second segment point B 204 input and the third segment point C 206 input are input in a sequential order. Based on this sequential order, the second segment point B 204 and the third segment point C 206 are identified as a second-third segment point pair. As such, each segment point may be included in one or more segment point pairs based on the sequential order of inputs. Thus, in aspects, some segment points will correspond to a single segment point pair, such as the first segment point A 202, while some segment points may correspond to two segment point pairs, such as second segment point B 204. In aspects, a user may manually identify segment point pairs. This may be done in addition to or in lieu of using the sequential order of segment point inputs to identify segment point pairs.

In FIG. 2C, a first structure point R 220 is identified. The first structure point R 220 may be determined using structure point determiner 124. For example, structure point R 220 may be identified at the intersection of a first structure line 234 and a second structure line 232. The first structure point R 220 corresponds to the second segment point B 204. In general, structure points may correspond to a particular segment point. In one embodiment, for instance, each segment point has two corresponding structure points.

The first structure line 234 is determined based on a first stroke width 248. The first stroke width 248 is best illustrated in FIG. 2E. The first stroke width 248 corresponds to the first-second segment point pair and is a measure of distance from the segment line 210 determined for the first-second segment point pair. Turning back to FIG. 2C, more specifically, the first structure line 234 is parallel to the first segment line 210, and the distance between the first structure line 234 and the first segment line 210 is half the first stroke width 242. That is, structure line determiner 126 determines the first structure line 234 by identifying a line that is parallel to the first segment line 210 and is at a distance equal to half the first stroke width, illustrated by distance 242.

The second structure line 232 is determined using structure line determiner 126. The second structure line 232 is parallel to the second segment line 212, and the lines separated by a distance that is half a second stroke width 244. That is, structure line determiner 126 determines the second structure line 232 by identifying a line that is parallel to the second segment line 212 and is at a distance equal to half the second stroke width 244. Turning briefly back to FIG. 2E, in one embodiment, the first stroke width 248 is equal to the second stroke width 249.

In an aspect, the first structure line 234 corresponding to the first segment line 210 and the second structure line 232 corresponding to the second segment line 212 are determined by the structure line determiner 126 for a same respective lateral side. That is, as illustrated in FIG. 2C, first structure line 234 is determined parallel to the first segment line 210 and is positioned on a first lateral side 280 of the first segment line 210. Moreover, second structure line 232 is determined parallel to the second segment line 212 and is positioned on a second lateral side 282 of the second segment line 212. The first lateral side 280, relative to the first segment line 210, is the same as the second lateral side 282, relative to the second segment line 212.

As illustrated in FIG. 2D, a second structure point S 222 is determined using structure point determiner 124. Structure point determiner 124 identifies the second structure point S 222 based on the second structure point S 222 being collinear with the first structure point R 220. The second structure point S 222 corresponds to the second segment point B 204. Here, the location of the second structure point S 222 is determined based on the first stroke width 248 (shown in FIG. 2E). More specifically, a segment perpendicular to the first segment line 222 intersects a line determined from the second segment point B 204 and the first structure point R 200 at a location corresponding to the second structure point S 222, wherein the segment perpendicular to the first segment line 222 is at distance that is half the first stroke width 246. The first structure point R 220, second structure point S 222, and second segment point B 204 are collinear.

Turning to FIG. 2E, other structure points are determined. In particular, a third structure point Y 226 and a fourth structure point X 224, corresponding to the first segment point A 202, are identified. Similarly, a fifth structure point G 228 and a sixth structure point F 229, corresponding to the third segment point C 206, are identified. The structure point determiner 124 determines the third structure point Y 226 as both along the first structure line 234 and collinear with the first segment point A 202 and the fourth structure point X 224. In addition, the structure point determiner 124 determines the fourth structure point X 224 as both along the third structure line 236 and collinear with the first segment point A 202 and the third structure point Y 226.

In addition, the structure point determiner 124 determines the third structure point Y 226 as along the first structure line 234 and the fourth structure point X 224 as along the third structure line 236. The structure line determiner 126 determines the third structure line 236 as parallel to the first segment line 210 and positioned on a third lateral side 281 of the first segment line 210. Similarly, the structure line determiner 126 determines the fourth structure line 235 as parallel to the second segment line 212 and positioned on a fourth lateral side 283 of the second segment line 212. The third lateral side 281, relative to the first segment line 210, is the same as the fourth lateral side 283, relative to the second segment line 212.

The structure point determiner 124 also determines a fifth structure point G 228 and a sixth structure point F 229. The fifth structure point G 228 and sixth structure point F 229 correspond to the third segment point C 206. The fifth structure point G 228 is determined as being along the second structure line 232, while the sixth structure point F 229 is determined as being along the fourth structure line 235. In addition, the fifth structure point G 228 and sixth structure point F 229 are determined as being collinear with each other and the third segment point C 206.

Objects may be generated by connecting various structure points. In particular, an edge of a stroke may be formed by connecting segment points and any corresponding structure points. In FIG. 2E, a first edge 237 is formed by connecting the third structure point Y 226, fourth structure point X 224, and first segment point A 202. The first edge, among others, may be created by the object generator 128.

Further, a second edge is generated by connecting the first structure point R 220, second structure point S 222, and second segment point B 204. The second edge 239 is the edge of the folded joint. Collectively, the first edge 237, first structure line 234, second edge 239, and third structure line 236 form a linear fragment (e.g., a first stroke 290) of the object. In particular, the first structure line 234 and the third structure line 236 form at least a portion of the lateral edges of the first stroke 290.

The location of the fifth structure point G 228 is identified as falling on the second structure line 232. Similar to the first edge 237, the third edge 238 is configured to connect the fifth structure point G 228, the sixth structure point F 229, and the third segment point C 206. In addition, the location of the sixth structure point F 229 is identified along the fourth structure line 235. The fourth structure line 235 is parallel to the second segment line 212 and the second structure line 232 and along the second structure point S 222. Collectively, the second edge 239, second structure line 232, third edge 238, and fourth structure line 235 form another linear fragment (e.g., a second stroke 292) of the object. In particular, the second structure line 232 and the fourth structure line 235 form at least a portion of the lateral edges of the second stroke 292.

Taken together, by connecting the structure points of the second segment point B 204 with structure points corresponding to the first segment point A 202 and the third segment point C 206, an object with a folded joint is generated. In particular, the first structure line 234, second structure line 232, third structure line 236, fourth structure line 235, first edge 237, second edge 239, and third edge 238 form at least a portion of the perimeter of the rendered object. Put another way, because the first stroke 290 and the second stroke 292 are derived from the aforementioned structure lines and edges, the first stroke 290 and second stroke 292, when combined, form the object.

FIG. 2F depicts at least a portion of the object generated in the method illustrated by FIGS. 2A-2E. The object of FIG. 2F includes a third stroke 294 in addition to a second folded joint at the third segment point C 206 for the purpose of exemplifying how multiple folded joints may be configured and generated for a single object. Although a continuation of the illustrations in FIG. 2A-2E, some references to elements have been omitted for the sake of clarity and understanding.

FIG. 2F also depicts in further detail the process used by the structure point determiner 126 to identify the location of the first structure point R 220. In particular, structure lines, determined using structure line determiner 126, may be determined from intermediate points. For instance, in FIG. 2F, two intermediate points are identified, illustrated here as a first intermediate point Q 262 and a second intermediate point P 260. Generally, intermediate points may be identified based on a stroke width, a segment line, and the location of a segment point. The first intermediate point 262, for instance, is identified at a location determined by summing a first vector 263, having a magnitude half the first stroke width and oriented perpendicular to the first segment line, with the second segment point B 204. Similarly, the second intermediate point 260 is identified at a location determined by summing a second vector 261, having a magnitude half the second stroke width and oriented perpendicular to the second segment line, with the second segment point B 204. The first structure line 234 is determined as being parallel to the first segment line 210 and passing through the first intermediate point 262. Likewise, the second structure line is determined as being parallel to the second segment line 212 and passing through the second intermediate point 260. The first structure point R 220 is identified at the intersection of the first structure line 234 and the second structure line 232.

Mathematically, the operations performed for identifying the location of the first structure point R 220 may be performed as provided in the following example. The location of the first segment point A 202, the second segment point B 204, and the third segment point C 206 are represented as vectors with an X and a Y component:

$$\overline{A} = (A_x, A_y), \overline{B} = (B_x, B_y), \overline{C} = (C_x, C_y)$$

Two new vectors are defined. Vector V1 represents the difference between vectors A and B. Vector V2 represents the difference between vectors C and B.

$$\overline{V1} = \overline{A} - \overline{B}$$
$$\overline{V1} = \{(A_x - B_x), (A_y - B_y)\}$$
$$\overline{V2} = \overline{C} - \overline{B}$$
$$\overline{V2} = \{(C_x - B_x), (C_y - B_y)\}$$

Unit vectors of V1 and V2 may be defined as:

$$\hat{V1} = \frac{\overline{V1}}{|\overline{V1}|}, \hat{V2} = \frac{\overline{V2}}{|\overline{V2}|}$$

With reference to intermediary point Q 262 and intermediary point P 260, the following vectors are defined as:

$$\overline{BQ} = \{-\hat{V1}_y, \hat{V1}_x\} * \frac{SW}{2}, |\overline{BQ}| = \frac{SW}{2}$$
$$\overline{BP} = \{-\hat{V2}_y, \hat{V2}_x\} * \frac{SW}{2}, |\overline{BP}| = \frac{SW}{2}$$

where SW is the first stroke width 248 of FIG. 2A-2E. In FIG. 2F, vector BQ is represented as vector 263, while vector BP is represented as vector 261.

Vector BQ 263 and vector BP 261 are individually summed with the X and Y component of the second segment point B 204 to obtain intermediary points P 260 and Q 262:

$$\overline{P} = \overline{BP} + \overline{B}$$
$$\overline{Q} = \overline{BQ} + \overline{B}.$$

The first structure line 234 is determined as being parallel to the first segment line 210 and passing through point Q 262. The slope $m_1$ of the first structure line 234 is therefore equal to the slope of the first segment line 210:

$m_1$=slope(AB).

The second structure line 232 is determined as being parallel to the second segment line 212 and passing through intermediary point P 260. The slope $m_2$ of the second structure line 232 is equal to the slope of the second line 212:

$m_2$=slope(CB).

The intersection of the first structure line 234 and the second structure line 232 is determined at the location of the first structure point R 220.

In some embodiments, additional folded joints may change the location of structure points if the structure points correspond to a segment point where a folded joint is newly introduced. This is demonstrated in FIG. 2F where, upon the addition of the third stroke 294, the location of the fifth structure point G 228 and sixth structure point F 229 are further defined to generate the folded joint at the third segment point C 206. In general, the structure point determiner 124 may determine the fifth structure point G 228 and sixth structure point F 229 using operations similar to those performed for determining the first structure point R 220 and second structure point S, respectively. Like the structure points, the orientation of an edge may change if the edge corresponds to a segment point where a folded joint is newly introduced. For instance, in FIG. 2F, as the fifth structure point G 228 and the sixth structure point F 229 are further defined, so too is the third edge 238. This is because, to precisely form the folded appearance, the third edge 238 connects the fifth structure point 228, the sixth structure point F 229, and the third segment point C 206, each of the points being collinear, as described above.

The method 400 of FIG. 4 depicts one exemplary method by which a folded joint may be generated for an object rendered on a digital canvas. Each block of the method diagram 400 and any other methods described herein comprises a computing process performed using any combination of hardware, firmware, or software. For instance, various functions can be carried out by a processor executing instructions stored in memory. The methods can also be embodied as computer-usable instructions stored on computer storage media. Per block 410, segment points are received at a canvas. The canvas may be the canvas pursuant to FIGS. 2A-2F. The segment points may be received by way of user input at computing device 102. In one embodiment, at least three segment points are received, e.g., a first, second, and third segment point. The segment points identify a location on a canvas. The location may be identified by the segment point identifier 120 of the object rendering engine 118. The segment points may be retrieved from the data store 104 and delivered to the object rendering engine 118 by the server 116. In one embodiment, the segment point identifier 120 uses a segment point inputs metadata to identify the location.

The method also includes determining a first-second segment point pair by associating the first segment point with the second segment point, per block 420. The first-second segment point pair may be represented on the canvas by a first segment line with the first and second segment points comprising the segment line's endpoints, as illustrated by element 210 in FIGS. 2B-2E. The segment line representing the first-second segment point pair may be determined by the segment line determiner 122 of the object rendering engine 118.

Similarly, the method may further comprise determining a second-third segment point pair by associating the second segment point with the third segment point, per block 430. The second-third segment point pair may also be represented on the canvas with a second segment line 210 determined by the segment line determiner 122.

Turning to block 440, the method further includes identifying structure points on the canvas. In particular, a first structure point and a second structure point may be identified. The first structure point and the second structure point may correspond to the second segment point. The first structure point may be identified at an intersection of two structure lines. This operation may be performed by the structure point determiner 124 in accordance with the embodiment disclosed in FIGS. 2A-2F. Specifically, the first structure point may be identified at an intersection of a first structure line and a second structure line, where the first structure line is determined from a first-stroke width for the first-second segment pair, and the second structure line is determined from a second stroke width for the second-third segment point pair. The first and second structure lines may be determined by the structure line determiner 126. The structure line determiner may use one or intermediate points for determining the structure lines. Further, the second structure point may be identified as being collinear with the first structure point and the second segment point, and may be determined from the first stroke width.

The method further comprises generating, for display on the canvas, an object with the folded joint, as presented in block 450. The object may be generated by the object generator 128. The object generator 128 may generate the object by connecting the first structure point and the second structure point with other structure points. Specifically, the first and second structure points may be connected with structure points corresponding to the first or third segment points. The structure points corresponding to the first segment point may comprise at least a third structure point and a fourth structure point as resembled by the third structure point Y 226 and fourth structure point X 224 in FIGS. 2E-2F, respectively. The third structure point may be identified as falling on the first structure line, whereas the second structure point may be identified as falling on the second structure line. Similarly, the structure points corresponding to the third segment point may comprise at least a fifth structure point and a sixth structure point in accordance with the fifth structure point G 228 and sixth structure point F 229 in FIGS. 2E-2F, respectively. The object may be generated at least partially by connecting the first structure point with the third and fifth structure points, and by connecting the second structure point to the fourth and sixth structure points.

Turning to FIG. 5, an exemplary method 500 for generating folded joints for an object is illustrated. The system may comprise a processor executing instructions stored in memory, where the processor performs operations including at least receiving segment points, per block 510. The segment points may be received by way of user input at computing device 102. In one embodiment, at least three segment points are received, e.g., a first, second, and third segment point. The segment points may identify a location on a canvas, an operation performed by the segment point identifier 120. The segment point inputs may be received by the object rendering engine 118 in the manner described with respect to FIG. 4. Further, the first and the second segment points may form a first-second segment point pair, while the second and third segment points may form a second-third segment point pair. The segment point pairs may be drawn on the canvas as segment lines determined by the segment line determiner 122.

Turning to block 520, the processors of the system may further execute operations comprising displaying, on the canvas, an object. The object may be generated by the object generator 128 and displayed on computing device 102. The object generator 128 may generate the object by connecting various structure points. In some embodiments, a first structure point and a second structure point may be connected with other structure points. The first and second structure points may, in particular, be connected with structure points corresponding to the first or third segment points. In one embodiment, the connections may be performed with structure points corresponding to the first and third segment points, which may comprise a third, fourth, fifth, and sixth structure point. Further, the connections may be coincident with various structure lines as disclosed in the embodiments above. The structure points may be determined by the structure point determiner 124. The first structure point may be determined similar to the manner described in FIG. 4, e.g., at the intersection of two structure lines. The two structure lines may comprise a first and second structure line. The first structure line may be determined from a first stroke width for the first-second segment point pair, and the second structure line may be determined from a second stroke width for the second-third segment point pair. These operations may be performed by the structure line determiner 126. Furthermore, the second structure point may be determined by the structure point determiner 124 as collinear with the first structure point and the second segment point and from the first stroke width.

FIG. 6 contains a computer media diagram 600 depicting another embodiment of the present technology. The steps of the computer media diagram 600 may be embodied as computer-usable instructions stored on computer storage media. In the embodiment, computer media may perform operations including receiving segment points, as described in block 610. The segment points may comprise at least three segment points, e.g., a first, second, and third segment point. The segment points may be received and identified in a manner similar to that described with respect to embodiments of methods 400 and 500. In addition, the first and second segment points may form a first-second segment pair, and the second and third segment points may form a second-third segment point pair. The segment point pairs may be illustrated by segment lines determined from the segment line determiner 122 and depicted in FIG. 2. From the segment point pairs, structure lines may be determined by the structure line determiner 126. In particular, a first structure line may be determined based on a first stroke width for the first-second segment point pair, and a second structure line may be determined based on a stroke width for the second-third segment point pair, in accordance with block 620 and block 630, respectively.

Referencing block 640, an object may be rendered on a canvas. The object may be generated for rendering at either the computing device 102 or the object rendering engine 118, e.g., the object may be generated at server 116 and communicated for display at computing device 102 or generated at computing device 102 and rendered for display at the same device. The rendered object may be generated by the same methods and steps described with regards to block 520 of method 500.

Figure 7:
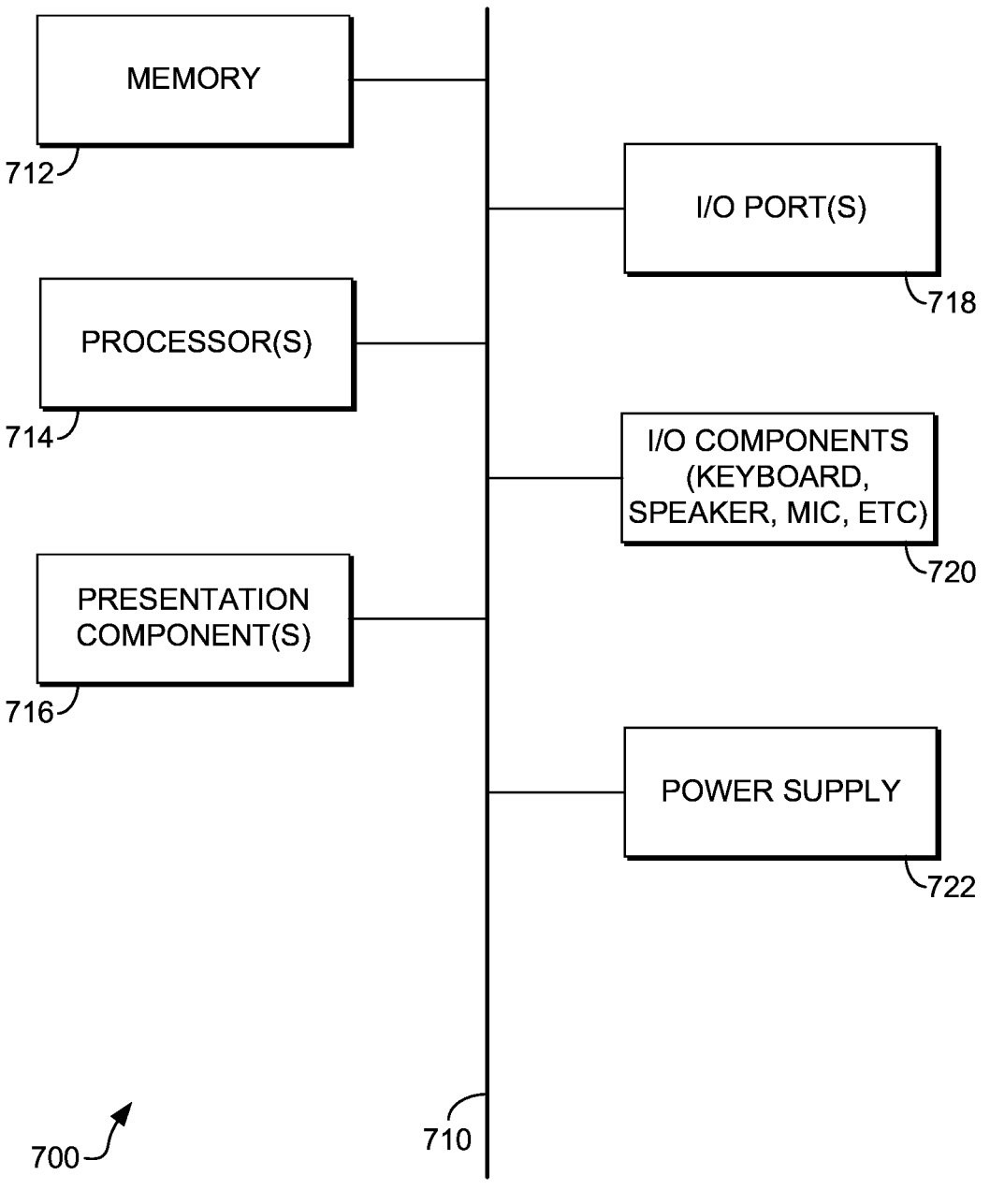
FIG. 7 is a block diagram of an example computing environment suitable for use in implementing embodiments of the technology described herein.

Having described implementations of the present disclosure, an exemplary operating environment in which embodiments of the present technology can be implemented is described below in order to provide a general context for various aspects of the present disclosure. Referring to FIG. 7, an exemplary operating environment for implementing embodiments of the present technology is shown and designated generally as computing device 700. Computing device 700 is but one example of a suitable computing environment and is not intended to suggest any limitation as to the scope of use or functionality of the technology, and neither should the computing device 700 be interpreted as having any dependency or requirement relating to any one or combination of components illustrated.

The technology can be described in the general context of computer code or machine-useable instructions, including computer-executable instructions such as program modules being executed by a computer or other machine, such as a personal data assistant or other handheld device. Generally, program modules including routines, programs, objects, components, data structures, etc., refer to code that performs particular tasks or implements particular abstract data types. The technology can be practiced in a variety of system configurations, including hand-held devices, consumer electronics, general-purpose computers, more specialty computing devices, etc. The technology can also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what can be one or more buses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventors recognize that such is the nature of the art, and reiterate that the diagram of FIG. 7 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 7 and referred to "computing device."

Computing device 700 typically includes a variety of computer-readable media. Computer-readable media can be any available media that can be accessed by computing device 700 and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for the storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and which can be accessed by computing device 500. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile or non-volatile memory. The memory can be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which can be built in. Illustrative components include a microphone, joystick, game pad, satellite dish, scanner, printer, wireless device, etc. The I/O components 720 can provide a natural user interface (NUI) that processes air gestures, voice, or other physiological inputs generated by a user. In some instances, inputs can be transmitted to an appropriate network element for further processing. An NUI can implement any combination of speech recognition, touch and stylus recognition, facial recognition, biometric recognition, gesture recognition both on screen and adjacent to the screen, air gestures, head and eye-tracking, and touch recognition associated with displays on the computing device 500. The computing device 700 can be equipped with depth cameras, such as stereoscopic camera systems, infrared camera systems, RGB camera systems, and combinations of these for gesture detection and recognition. Additionally, the computing device 700 can be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, or software, as described below. For instance, various functions can be carried out by a processor executing instructions stored in memory. As such, other arrangements and elements (e.g., machines, interfaces, functions, orders, and groupings of functions) can be used in addition to or instead of those shown.

Embodiments described herein can be combined with one or more of the specifically described alternatives. In particular, an embodiment that is claimed can contain a reference, in the alternative, to more than one other embodiment. The embodiment that is claimed can specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" or "block" can be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology can generally refer to the technical solution environment and the schematics described herein, it is understood that the techniques described can be extended to other implementation contexts.

From the foregoing, it will be seen that this technology is one well adapted to attain all the ends and objects set forth above, together with other advantages that are obvious and inherent to the system and method. It will be understood that certain features and subcombinations are of utility and can be employed without reference to other features and subcombinations. This is contemplated by and is within the scope of the claims.

Some example aspects that may be performed from the foregoing description include, but are not limited to, the following:

Aspect 1: A method performed by one or more processors, the method comprising: receiving at least three segment points, the at least three segment points including a first, second, and third segment point, each segment point identifying a location on a canvas; determining a first-second segment point pair by associating the first segment point with the second segment point; determining a second-third segment point pair by associating the second segment point with the third segment point; identifying a first structure point and a second structure point on the canvas, the first structure point and the second structure point corresponding to the second segment point, wherein: the first structure point is identified at a first intersection of a first structure line determined from a first stroke width for the first-second segment point pair and a second structure line determined from a second stroke width for the second-third segment point pair; and the second structure point is identified as collinear with the first structure point and the second segment point, and is determined from the first stroke width; and generating, for display on the canvas, an object defined by connecting the first structure point and the second structure point with structure points corresponding to the first segment point and with structure points corresponding to the third segment point.

Aspect 2: Aspect 1, further comprising: identifying a third, fourth, fifth, and sixth structure point, the third and fourth structure points corresponding to the first segment point, the fifth and sixth structure points corresponding to the third segment point; connecting the first structure point with the third and fifth structure points, thereby forming at least a portion of the first structure line and the second structure line, respectively; and connecting the second structure point with the fourth and sixth structure points, thereby forming at least a portion of a third structure line and a fourth structure line, respectively.

Aspect 3: Aspect 2, wherein identifying the third and fourth structure points comprises identifying locations on the canvas collinear with the first segment point and spaced apart from the first segment point by half the first stroke width.

Aspect 4: Any of Aspects 2-3: wherein identifying the fifth and sixth structure points comprises identifying locations on the canvas collinear with the third segment point and spaced apart from the third segment point by half the second stroke width.

Aspect 5: Any of Aspects 2-4, wherein generating the object for display comprises: forming a portion of a perimeter of the object coincident with a first line connecting the third structure point, the fourth structure point, and the first segment point; and forming another portion of the perimeter of the object coincident with a second line connecting the fifth structure point, the sixth structure point, and the third segment point.

Aspect 6: Any of Aspects 1-5, wherein generating the object for display comprises: forming a portion of a perimeter of the object coincident with the first structure line; and forming another portion of the perimeter of the object coincident with the second structure line.

Aspect 7: Any of Aspects 1-6, further comprising: determining a first segment line from the first-second segment point pair, the first and second segment points being endpoints of the first segment line; and determining a second segment line from the second-third segment point pair, the second and third segment points being endpoints of the second segment line.

Aspect 8: A system comprising: at least one processor; one or more computer storage media having computer-executable instructions embodied thereon that, when executed by the at least one processor, cause the at least one processor to perform operations comprising: receiving at least three segment points, the at least three segment points comprising a first, second, and third segment point, each segment point identifying a location on a canvas, the first segment point and the second segment point forming a first-second segment point pair, the second segment point and the third segment point forming a second-third segment point pair; and displaying, on the canvas, an object generated by connecting a first structure point and a second structure point with structure points corresponding to the first segment point and with structure points corresponding to the third segment point, the first structure point identified based on a first intersection of a first structure line determined from a first stroke width for the first-second segment point pair and a second structure line determined from a second stroke width for the second-third segment point pair, the second structure point identified as collinear with the first structure point and the second segment point and determined from the first stroke width.

Aspect 9: Any of Aspects 2-7 in combination with Aspect 8.

Aspect 10: One or more computer storage media having computer-executable instructions embodied thereon that, when executed by at least one processor, cause the at least one processor to perform operations comprising: receiving at least three segment points, the at least three segment points comprising a first, second, and third segment point, each segment point identifying a location on a canvas, the first segment point and the second segment point forming a first-second segment point pair, the second segment point and the third segment point forming a second-third segment point pair; identifying a first structure line based on a first stroke width for the first-second segment point pair; identifying a second structure line based on a second stroke width for the second-third segment point pair; and generating, for display on the canvas, an object generated by connecting a first structure point and a second structure point with structure points corresponding to the first segment point and with structure points corresponding to the third segment point, wherein: the first structure point is at a location on the canvas corresponding to an intersection of the first structure line and the second structure line; the second structure point is at a location on the canvas determined from the first stroke width, the location producing collinearity between the second structure point, the first structure point, and the second segment point.

Aspect 11: Any of Aspects 2-7 in combination with Aspect 10.

What is claimed is:

1. A method performed by one or more processors, the method comprising:
   receiving at least three segment points as inputs in a sequential order, the at least three segment points including a first, second, and third segment point, each segment point identifying a location on a canvas;
   determining a first-second segment point pair by associating the first segment point with the second segment point according to the sequential order of the at least three segment points when input;
   determining a second-third segment point pair by associating the second segment point with the third segment point according to the sequential order of the at least three segment points when input;
   identifying a first structure point and a second structure point on the canvas, the first structure point and the second structure point corresponding to the second segment point, wherein:
   the first structure point is identified at a first intersection of a first structure line determined from a first stroke width for the first-second segment point pair and a second structure line determined from a second stroke width for the second-third segment point pair; and
   the second structure point is identified as collinear with the first structure point and the second segment point, and is determined from the first stroke width;
   identifying a third, fourth, fifth, and sixth structure point, the third and fourth structure points corresponding to the first segment point, the fifth and sixth structure points corresponding to the third segment point;
   at least partially connecting the first structure point with the third and fifth structure points;
   at least partially connecting the second structure point with the fourth and sixth structure points; and
   generating an object on the canvas, the object defined by the connecting of the first structure point with the third and fifth structure points and the second structure point with the fourth and sixth structure points.

2. The method of claim 1, wherein identifying the third and fourth structure points comprises identifying locations on the canvas collinear with the first segment point and spaced apart from the first segment point by half the first stroke width.

3. The method of claim 1, wherein identifying the fifth and sixth structure points comprises identifying locations on the canvas collinear with the third segment point and spaced apart from the third segment point by half the second stroke width.

4. The method of claim 1, wherein generating the object comprises:
   forming a portion of a perimeter of the object coincident with a first line connecting the third structure point, the fourth structure point, and the first segment point; and
   forming another portion of the perimeter of the object coincident with a second line connecting the fifth structure point, the sixth structure point, and the third segment point.

5. The method of claim 1, wherein generating the object comprises:
   forming a portion of a perimeter of the object coincident with the first structure line; and forming another portion of the perimeter of the object coincident with the second structure line.

6. The method of claim 1, further comprising:

determining a first segment line from the first-second segment point pair, the first and second segment points being endpoints of the first segment line; and determining a second segment line from the second-third segment point pair, the second and third segment points being endpoints of the second segment line.

7. A system comprising:

at least one processor;

one or more computer storage media having computer-executable instructions embodied thereon that, when executed by the at least one processor, cause the at least one processor to perform operations comprising:

receiving at least three segment points as inputs in a sequential order, the at least three segment points comprising a first, second, and third segment point, each segment point identifying a location on a canvas, the first segment point and the second segment point forming a first-second segment point pair based on the sequential order of the at least three segment points when input, the second segment point and the third segment point forming a second-third segment point pair based on the sequential order of the at least three segment points when input; and generating an object on the canvas by:

connecting a first structure point with third and fifth structure points, the third structure point corresponding to the first segment point and the fifth structure point corresponding to the third segment point; and connecting a second structure point with fourth and sixth structure points, the fourth structure point corresponding to the first segment point and the sixth structure point corresponding to the third segment point wherein the first structure point is identified based on a first intersection of a first structure line determined from a first stroke width for the first-second segment point pair and a second structure line is determined from a second stroke width for the second-third segment point pair, the second structure point identified as collinear with the first structure point and the second segment point and determined from the first stroke width.

8. The system of claim 7, wherein the third and fourth structure points are identified at locations on the canvas collinear with the first segment point and spaced apart from the first segment point by half the first stroke width.

9. The system of claim 7, wherein the fifth and sixth structure points are identified at locations on the canvas collinear with the third segment point and spaced apart from the third segment point by half the second stroke width.

10. The system of claim 7, wherein the object is generated by:

forming a portion of a perimeter of the object coincident with a first line connecting the third structure point, the fourth structure point, and the first segment point; and forming another portion of the perimeter of the object coincident with a second line connecting the fifth structure point, the sixth structure point, and the third segment point.

11. The system of claim 7, wherein the object is generated by:

forming a portion of a perimeter of the object coincident with the first structure line; and forming another portion of the perimeter of the object coincident with the second structure line.

12. The system of claim 7, wherein operations further comprise:

determining a first segment line from the first-second segment point pair, the first and second segments point being endpoints of the first segment line, wherein the first structure line is parallel to the first segment line; and determining a second segment line from the second-third segment point pair, the second and third segment points being endpoints of the second segment line, wherein the second structure line is parallel to the second segment line.

13. One or more computer storage media having computer-executable instructions embodied thereon that, when executed by at least one processor, cause the at least one processor to perform operations for generating an object on a digital canvas, the operations comprising:

receiving at least three segment points as inputs in a sequential order, the at least three segment points comprising a first, second, and third segment point, each segment point identifying a location on the canvas, the first segment point and the second segment point forming a first-second segment point pair based on the sequential order of the at least three segment points when input, the second segment point and the third segment point forming a second-third segment point pair based on the sequential order of the at least three segment points when input;

identifying a first structure line based on a first stroke width for the first-second segment point pair;

identifying a second structure line based on a second stroke width for the second-third segment point pair;

connecting, on the canvas, a first structure point with third and fifth structure points, the third structure point corresponding to the first segment point and the fifth structure point corresponding to the third segment point; and connecting, on the canvas, a second structure point with fourth and sixth structure points, the fourth structure point corresponding to the first segment point and the sixth structure point corresponding to the third segment point, wherein:

the first structure point is at a location on the canvas corresponding to an intersection of the first structure line and the second structure line;

the second structure point is at a location on the canvas determined from the first stroke width, the location producing collinearity between the second structure point, the first structure point, and the second segment point.

14. The media of claim 13, wherein identifying the third and fourth structure points comprises identifying locations on the canvas collinear with the first segment point and spaced apart from the first segment point by half the first stroke width.

15. The media of claim 13, wherein identifying the fifth and sixth structure points comprises identifying locations on the canvas collinear with the third segment point and spaced apart from the third segment point by half the second stroke width.

16. The media of claim 13, wherein the operations further comprise:

forming a portion of a perimeter of the object coincident with a first line connecting the third structure point, the fourth structure point, and the first segment point; and forming another portion of the perimeter of the object coincident with a second line connecting the fifth structure point, the sixth structure point, and the third segment point.

17. The media of claim 13, wherein the operations further comprise:

forming a portion of a perimeter of the object coincident with the first structure line; and forming another portion of the perimeter of the object coincident with the second structure line.

* * * * *